US006445486B1

(12) United States Patent
Lomprey et al.

(10) Patent No.: US 6,445,486 B1
(45) Date of Patent: Sep. 3, 2002

(54) ELECTROACTIVE MATERIALS AND BENEFICIAL AGENTS HAVING A SOLUBILIZING MOIETY

(75) Inventors: Jeffrey R. Lomprey; Thomas F. Guarr; Kelvin L. Baumann; Punam Giri, all of Holland, MI (US)

(73) Assignee: Gentex Corporation, Zeeland, MI (US)

( * ) Notice: Subject to any disclaimer, the term of this patent is extended or adjusted under 35 U.S.C. 154(b) by 70 days.

(21) Appl. No.: 09/724,118

(22) Filed: Nov. 28, 2000

Related U.S. Application Data

(63) Continuation-in-part of application No. 09/454,043, filed on Dec. 3, 1999.

(51) Int. Cl.[7] .......................... G02F 1/15; G02F 11/53; F21V 9/00
(52) U.S. Cl. ................. 359/265; 359/267; 359/270; 359/273; 252/582; 252/586
(58) Field of Search ................. 359/265–275; 252/582, 286

(56) References Cited

U.S. PATENT DOCUMENTS

| 4,402,573 A | 9/1983 | Jones |
|---|---|---|
| 4,902,108 A | 2/1990 | Byker |
| 5,724,187 A | 3/1998 | Varaprasad et al. |
| 5,910,854 A | 6/1999 | Varaprasad et al. |
| 5,998,617 A | 12/1999 | Srinivasa et al. |
| 6,002,511 A | 12/1999 | Varaprasad et al. |
| 6,154,306 A | * 11/2000 | Varaprasad et al. ......... 359/273 |
| 6,183,878 B1 | 2/2001 | Berneth et al. |
| 6,188,505 B1 | 2/2001 | Lomprey et al. |
| 6,193,912 B1 | 2/2001 | Theiste et al. |
| 6,241,916 B1 | 6/2001 | Claussen et al. |
| 6,277,307 B1 | 8/2001 | Berneth et al. |
| 6,301,038 B1 | 10/2001 | Fitzmaurice et al. |

FOREIGN PATENT DOCUMENTS

| SU | 830456 A1 | 2/1993 |
|---|---|---|
| WO | PCT/EP97/00499 | 8/1997 |

* cited by examiner

*Primary Examiner*—Hung Xuan Dang
*Assistant Examiner*—Tuyen Tra
(74) *Attorney, Agent, or Firm*—King & Jovanovic, PLC; Brian J. Rees

(57) ABSTRACT

An electrochromic medium for use in an electrochromic device comprising: at least one solvent; a cathodic electroactive material; an anodic electroactive material; an optional beneficial agent; wherein at least one of the cathodic and anodic electroactive materials is electrochromic; and wherein at least one of the cathodic electroactive material, anodic electroactive material, and/or optional beneficial agent is associated with a solubilizing moiety which serves to increase solubility of the associated material or agent relative to the same without the solubilizing moiety.

54 Claims, 1 Drawing Sheet

ELECTROACTIVE MATERIALS AND BENEFICIAL AGENTS HAVING A SOLUBILIZING MOIETY

CROSS-REFERENCE TO RELATED APPLICATION(S)

This application is a continuation-in-part of U.S. application Ser. No. 09/454,043, filed Dec. 3, 1999.

BACKGROUND OF THE INVENTION

1. Field of the Invention

The present invention relates in general to electroactive materials and beneficial agents for use in electrochromic devices, and more particularly, to an electroactive material and/or beneficial agent associated with a solubilizing moiety which serves to increase solubility of the associated material or agent relative to the same without such a solubilizing moiety.

2. Background Art

Electrochromic devices have been known in the art for several years. Furthermore, experimentation associated with the utilization of various electroactive materials and/or beneficial agents has also been explored. While the utilization of such electroactive materials and/or beneficial agents in devices such as electrochromic mirrors and windows has been identified, the solubility characteristics of many of these materials and agents remain largely problematic for commercial applications—especially where the particular device is routinely exposed to extreme climate variations.

It is therefore an object of the present invention to provide electroactive materials and/or beneficial agents with a solubilizing moiety that remedies the aforementioned detriments and/or complications associated with the incorporation of the above-identified materials and agents into a suitable electrochromic medium at an operatively desirous concentration.

SUMMARY OF THE INVENTION

The present invention is directed to an electrochromic medium for use in an electrochromic device comprising: (a) at least one solvent; (b) a cathodic electroactive material; (c) an anodic electroactive material; (d) wherein at least one of the cathodic and anodic electroactive materials is electrochromic; and (e) wherein at least one of the cathodic and anodic electroactive materials is associated with a solubilizing moiety which serves to increase solubility of one or both of the associated cathodic and anodic electroactive materials relative to the same without the solubilizing moiety.

The present invention is also directed to an electrochromic medium for use in an electrochromic device comprising: (a) at least one solvent; (b) a cathodic electroactive material; (c) an anodic electroactive material; (d) wherein at least one of the cathodic and anodic electroactive materials is electrochromic; and (e) a beneficial agent, wherein the beneficial agent includes a solubilizing moiety which serves to increase solubility of the beneficial agent relative to the same without the solubilizing moiety.

BRIEF DESCRIPTION OF THE DRAWINGS

The invention will now be described with reference to the drawings wherein.

DETAILED DESCRIPTION OF THE INVENTION

Figure 1:
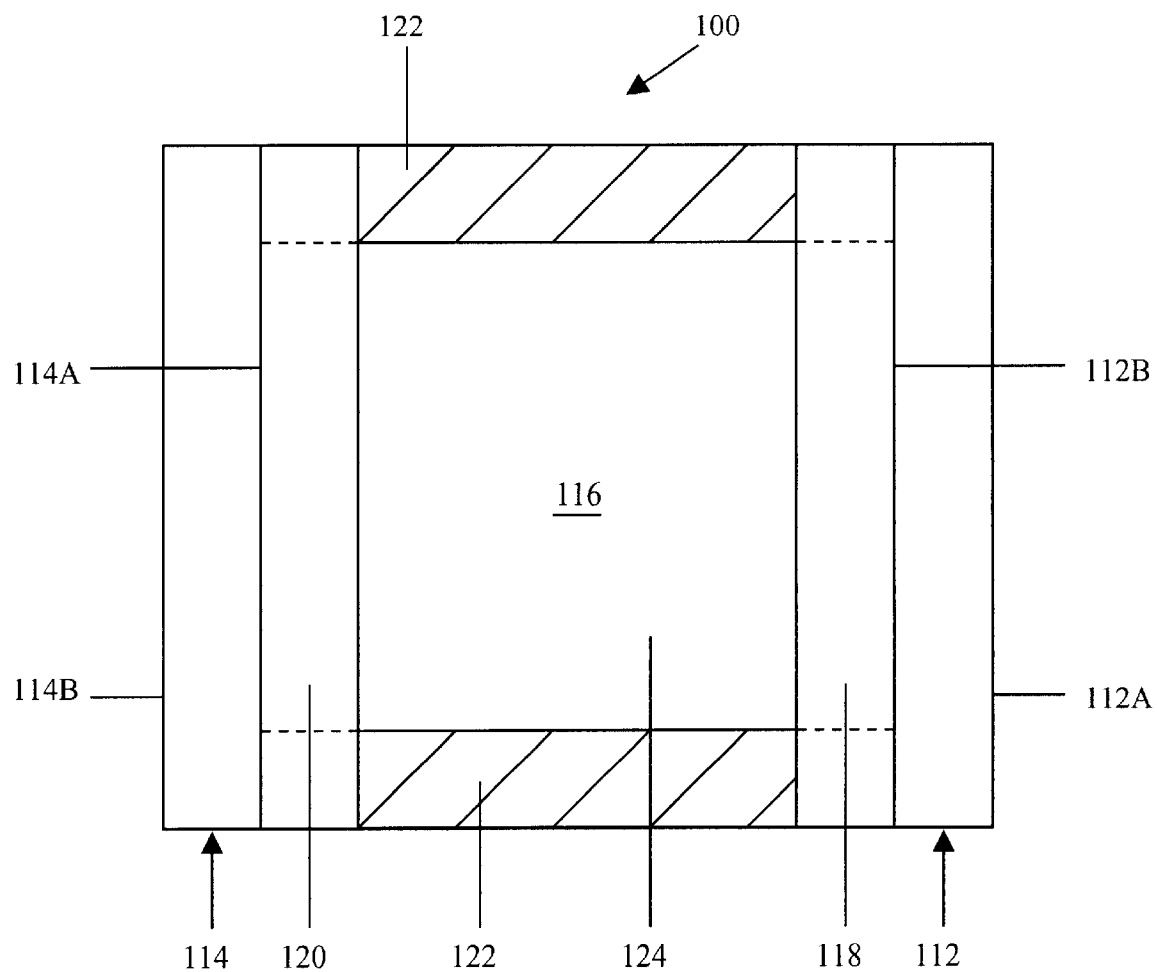
FIG. 1 of the drawings is a cross-sectional schematic representation of an electrochromic device fabricated in accordance with the present invention.

Referring now to the drawings and to FIG. 1 in particular, a cross-sectional schematic representation of electrochromic device 100 is shown, which generally comprises first substrate 112 having a front surface 112A and a rear surface 112B, second substrate 114 having a front surface 114A and a rear surface 114B, and chamber 116 for containing electrochromic medium 124. It will be understood that electrochromic device 100 may comprise, for illustrative purposes only, a mirror, a window, a display device, a contrast enhancement filter, and the like. It will be further understood that FIG. 1 is merely a schematic representation of electrochromic device 100. As such, some of the components have been distorted from their actual scale for pictorial clarity. Indeed, numerous other electrochromic device configurations are contemplated for use, including those disclosed in U.S. Pat. No. 5,818,625 entitled "Electrochromic Rearview Mirror Incorporating A Third Surface Metal Reflector," (hereinafter the '625 patent) which is hereby incorporated herein by reference in its entirety.

First substrate 112 may be fabricated from any one of a number of materials that are transparent or substantially transparent in the visible region of the electromagnetic spectrum, such as, for example, borosilicate glass, soda lime glass, float glass, natural and synthetic polymeric resins or plastics including Topas,® which is commercially available from Ticona of Summit, N.J. First substrate 112 is preferably fabricated from a sheet of glass having a thickness ranging from approximately 0.5 millimeters (mm) to approximately 12.7 mm. Of course, the thickness of the substrate will depend largely upon the particular application of the electrochromic device. While particular substrate materials have been disclosed, for illustrative purposes only, it will be understood that numerous other substrate materials are likewise contemplated for use—so long as the materials are at least substantially transparent and exhibit appropriate physical properties which will enable them to operate effectively in conditions of intended use. Indeed, electrochromic devices in accordance with the present invention can be, during normal operation, exposed to extreme temperatures as well as exposed to substantial ultraviolet radiation, emanating primarily-from the sun.

Second substrate 114 can be fabricated from similar materials as that of first substrate 112. However, if the electrochromic device is a mirror, then the requisite of substantial transparency is not necessary. As such, second substrate 114 may, alternatively, comprise polymers, metals, glass, ceramics, or other similar materials. Second substrate 114 is preferably fabricated from a sheet of glass having a thickness ranging from approximately 0.5 mm to approximately 12.7 mm. If first and second substrates 112 and 114, respectively, are fabricated from sheets of glass, then the glass can optionally be tempered or strengthened by thermal or chemical means prior to or subsequent to being coated with layers of electrically conductive material (118 and 120).

One or more layers of electrically conductive material 118 are associated with rear surface 112B of the first substrate. These layers serve as an electrode for the electrochromic device. Electrically conductive material 118 is desirably a material that: (a) is substantially transparent in the visible region of the electromagnetic spectrum; (b) bonds reasonably well to first substrate 112; (c) maintains this bond when associated with a sealing member; (d) is generally resistant to corrosion from materials contained within the electrochromic device or the atmosphere; and (e) exhibits minimal diffusion or specular reflectance as well as sufficient electrical conductance. It is contemplated that electrically conductive material 118 may be fabricated from fluorine doped tin oxide (FTO), for example TEC glass, which is commercially available from Libbey Owens-Ford-Co., of Toledo, Ohio., indium doped tin oxide (ITO), doped zinc oxide or other materials known in the art.

Electrically conductive material 120 is preferably associated with front surface 114A of second substrate 114, and is operatively bonded to electrically conductive material 118 by sealing member 122. As can be seen in FIG. 1, once bonded, sealing member 122 and the juxtaposed portions of electrically conductive materials 118 and 120 serve to define the inner peripheral geometry of chamber 116.

Electrically conductive material 120 may vary depending upon the intended use of the electrochromic device. For example, if the electrochromic device is a mirror, then the material may comprise a transparent conductive coating similar to electrically conductive material 118 (in which case a reflector is associated with rear surface 114B of second substrate 114). Alternatively, electrically conductive material 120 may comprise a layer of reflective material in accordance with the teachings of the above-referenced '625 patent. In this case, electrically conductive material 120 is associated with front surface 114A of second substrate 114. Typical coatings for this type of reflector include chromium, rhodium, ruthenium, silver, silver alloys, and stacked layers thereof.

Sealing member 122 may comprise any material that is capable of being adhesively bonded to the electrically conductive materials 118 and 120 to, in turn, seal chamber 116 so that electrochromic medium 124 does not inadvertently leak out of the chamber. As is shown in dashed lines in FIG. 1, it is also contemplated that the sealing member extend all the way to rear surface 112B and front surface 114A of their respective substrates. In such an embodiment, the layers of electrically conductive material 118 and 120 may be partially removed where the sealing member 122 is positioned. If electrically conductive materials 118 and 120 are not associated with their respective substrates, then sealing member 122 preferably bonds well to glass. It will be understood that sealing member 122 can be fabricated from any one of a number of materials including, for example, those disclosed in U.S. Pat. Nos. 4,297,401, 4,418,102, 4,695,490, 5,596,023, 5,596,024, 4,297,401, and U.S. patent application Ser. No. 09/158,423 entitled "Improved Seal For Electrochromic Devices," all of which are herein incorporated by reference.

Electrochromic medium 124 is shown in FIG. 1, which generally comprises an anodic electroactive and/or electrochromic material, a cathodic electroactive and/or electrochromic material, one or more solvents, and one or more optional beneficial agents. In accordance with the present invention, one or more of the above-identified medium materials or agents is associated with a solubilizing moiety which serves to increase solubility of the associated material or agent relative to the same without such a solubilizing moiety. As will be discussed in greater detail below, such a solubilizing moiety can greatly enhance a material's or agent's compatibility with an associated device—especially if the particular device is commonly exposed to extreme climate variations, as is commonly the case with electrochromic windows and mirrors. It will be understood that electrochromic medium 124 can be configured any one of a number of different ways, including the configurations disclosed in U.S. Pat. No. 6,020,987 entitled "Improved Electrochromic System for Producing a Preselected Color." The term "electrochromic" will be defined herein, regardless of its ordinary meaning, as a material that has a change in its extinction coefficient at one or more wavelengths upon exposure to a particular electrical potential difference. The term "electroactive" will be defined herein, regardless of its ordinary meaning, as a material that undergoes a modification in its oxidation state upon exposure to a particular electrical potential difference.

For purposes of the present disclosure, the electrochromic medium disclosed herein below may comprise any one of a number of media types including solution phase and gelled media as disclosed in U.S. Pat. No. 5,928,572 entitled "Electrochromic Layer and Devices Comprising Same," which is incorporated herein by reference.

It will be understood that the electroactive and/or electrochromic materials as well as the beneficial agents disclosed in the present invention may be combined or linked by a bridging unit in accordance with the teachings of International application Ser. No. PCT/EP97/00499 entitled "Electrochromic System."

It will be further understood that the electroactive and/or electrochromic materials as well as the beneficial agents disclosed in the present invention may also be "tied" into a gelatinous media in accordance with the teachings of U.S. Pat. No. 5,910,854 entitled "Electrochromic Polymeric Solid Films, Manufacturing Electrochromic Devices Using Such Solid Films, And Processes For Making Such Solid Films and Devices," which is incorporated herein by reference. In addition, a hybrid medium is likewise contemplated for use. In a hybrid medium, one of the cathodic or anodic materials can be applied (in a solid form) to its respective electrically conductive or semi-conductive material. For example, tungsten oxide ($WO_3$) or polyaniline can be applied onto the surface of a conventional electrically conductive material. Additionally, numerous viologens can be applied onto, among other materials, $TiO_2$.

Cathodic electroactive/electrochromic materials may include, for example, bipyridinyl based viologens, such as methylviologen tetrafluoroborate or octylviologen tetrafluoroborate as well as polymeric viologens. It will be understood that the preparation or commercial availability of the above-identified materials is well known in the art. While specific cathodic materials have been provided, for illustrative purposes only, numerous other conventional cathodic materials are likewise contemplated for use including, but by no means limited to, those disclosed in U.S. Pat. No. 4,902,108 and U.S. application Ser. No. 09/366,115 entitled "Electrochromic Materials with Enhanced Ultraviolet Stability" which are hereby incorporated in their entirety herein by reference. Indeed, the only contemplated limitation relative to the cathodic material is that it should not adversely affect the electrochromic performance of device 100. Moreover, it is contemplated that the cathodic material may comprise a solid transition metal oxide, including, but not limited to, tungsten oxide.

The anodic electroactive and/or electrochromic material may comprise any one of a number of materials including a metallocene, substituted metallocenes, ferrocene, substituted ferrocenes, substituted ferrocenyl salts, azines, phenazine, substituted phenazines, phenothiazine, substituted phenothiazines, triphenoazines, triphenodithiazines, triphenodioxazines, quinoxalinophenazines, carbazoles, and phenylenediamines. Examples of anodic materials may include di-tert-butyl-diethylferrocene, (6-(tetra-tert-butylferrocenyl)hexyl)triethylammonium tetrafluoroborate, (3-(tetra-tert-butylferrocenyl)propyl)triethylammonium tetrafluoroborate, 5,10-dimethylphenazine, and 3,7,10-trimethylphenothiazine.

Additional examples of anodic materials include those represented by the following formula:

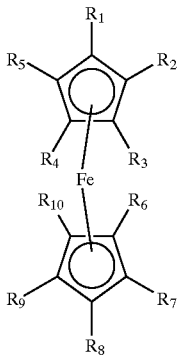

wherein $R_1$–$R_{10}$ are the same or different and comprise H or a straight or branched alkyl group containing approximately 1 to approximately 10 carbon atoms and wherein at least one of $R_1$–$R_{10}$ is associated with a solubilizing moiety. While specific anodic materials have been disclosed, for illustrative purposes only, any one of a number of anodic materials are likewise contemplated for use, so long as the particular anodic material exhibits appropriate "electroactive" and/or "electrochromic" qualities as the terms are defined herein. Several of the above-identified anodic materials, or their precursors, are available from common commercial chemical vendors, such as Aldrich Chemical Co., of Milwaukee, Wis.

In accordance with the present invention, a solubilizing moiety can be associated with one or more electroactive materials and/or one or more beneficial agents (see infra) which serve to increase the solubility of the associated material or agent relative to the same material without such a solubilizing moiety. Such increased solubility is highly desirous, inasmuch as, for example, many stable, electroactive materials and beneficial agents can exhibit problematic solubility (e.g. fogging, precipitation, phase separation, etc.) in common, commercially suitable solvents—especially in cold temperatures. For purposes of the present disclosure, the solubilizing moiety may comprise nitrites, nitro constituents, sulfoxides, sulfonates, sulfonate esters, carboxylates, phosphonium constituents, phosphonates, phosphonites, ammonium constituents, carbonyls including carbonates, carbamates, ketones, esters, and amides, ethers including polyethers, amines including tertiary amines, alcohols, lactones, imides, and mixtures thereof.

For example, the solubilizing moiety may be represented by one or more of the following formulae:

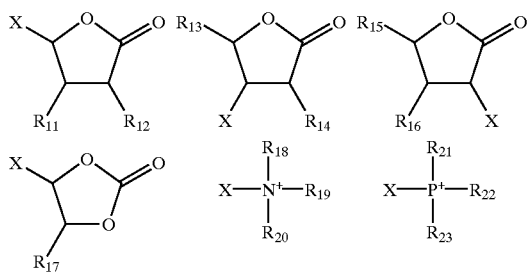

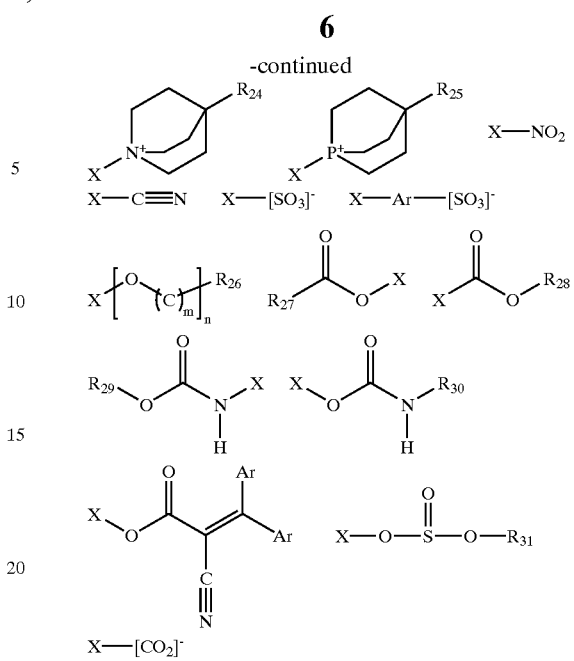

wherein $R_{11}$–$R_{31}$ are the same or different and comprise H or a straight or branched alkyl, aryl, alkaryl, or aralkyl group containing approximately 1 to approximately 10 carbon atoms, wherein Ar is an aryl constituent including phenyl, wherein m is an integer ranging from approximately 1 to approximately 5, wherein n is an integer ranging from approximately 1 to approximately 20, and wherein X is associated with an electroactive material or beneficial agent and is selected from the group comprising a direct bond, an alkyl, aryl, alkaryl, aralkyl, ether, or polyether chain containing approximately 1 to approximately 40 carbon atoms, a silyl or siloxyl chain containing approximately 1 to approximately 40 silicon atoms, and mixtures thereof.

Although not shown, it will be understood that many of the solubilizing moieties may comprise ionic constituents which are associated with balancing counter ions such as cations including group I and II metal cations, transition metal cations, ammonium cations, or other similar cations, or anions including halides, perchlorates, sulfonates including trifluoromethanesulfonate, bis-trifluoromethanesulfonamide, tetrafluoroborate, tetraphenylborate, hexafluorophosphate, or other similar anions.

Alternatively, the solubilizing moiety may be represented by the following formula:

Y—$R_{32}$ wherein Y is associated with an electroactive material and/or beneficial agent, serves to increase solubility of the same, and is selected from the group comprising an aryl, alkaryl, aralkyl, or polyether chain containing approximately 1 to approximately 40 carbon atoms, a silyl or siloxyl chain containing approximately 1 to approximately 40 silicon atoms, and mixtures thereof, and wherein $R_{32}$ comprises H or a straight or branched alkyl, aryl, alkaryl, or aralkyl group containing approximately 1 to approximately 10 carbon atoms.

While specific solubilizing moieties have been disclosed herein, it will be understood that any one of a number of other solubilizing moieties are contemplated for use, including non-electroactive (those which undergo a redox reaction outside of approximately –1.2 V to approximately 1.2 V vs.

Ag/AgCl—a preferred useful range for precluding solvent degradation), cathodic electroactive, anodic electroactive, such as phenazines or phenothiazines, UV stabilizing, and "solvent clone" moieties. The term "solvent clone" moiety is defined herein as a moiety that is analogous to the functional constituents of a particular solvent. Indeed, the only contemplated limitation with regard to the solubilizing moiety is that it must facilitate material increased solubility of the associated electroactive material or beneficial agent in an associated'solvent relative to the solubility of the electroactive material or beneficial agent without the solubilizing moiety. It will be understood that many of the above-identified solubilizing moieties comprise organic constituents, which are available from commercial chemical vendors including Aldrich Chemical Co.

For illustrative purposes only, the concentration of the anodic and cathodic electroactive materials can range from approximately 1 millimolar (mM) to approximately 1000 mM and more preferably from approximately 5 mM to approximately 500 mM. While particular concentrations of the anodic as well as cathodic materials have been provided, it will be understood that the desired concentration may vary greatly depending upon the geometric configuration of the chamber containing electrochromic medium 124.

For purposes of the present disclosure, the solvent of the electrochromic medium may comprise one or more of any one of a number of common, commercially available materials including 3-methylsulfolane, sulfolane, glutaronitrile, dimethyl sulfoxide, dimethyl formamide, acetonitrile, polyethers including tetraglyme, alcohols including ethoxyethanol, nitriles including 3-hydroxypropionitrile, 2-methylglutaronitrile, ketones including 2-acetylbutyrolactone, cyclopentanone, cyclic esters including beta-propiolactone, gamma-butyrolactone, gamma-valerolactone, carbonates including propylene carbonate, ethylene carbonate, and homogenous mixtures of the same. While specific solvents have been disclosed, for illustrative purposes only, as being associated with the electrochromic medium, numerous other solvents that would be known to those having ordinary skill in the art having the present disclosure before them are likewise contemplated for use. Indeed, it will be understood that non-liquid or polymer type electrochromic media are suitable for use in accordance with the present invention.

In addition, the electrochromic medium may also comprise one or more beneficial agents which may be associated with a solubilizing moiety, including light absorbers and/or blockers, light stabilizers, thermal stabilizers, antioxidants, viscosity modifiers including thickeners, and/or tint providing agents, and mixtures thereof. Suitable light stabilizers may include: the material ethyl-2-cyano-3,3-diphenyl acrylate, sold by BASF of Parsippany, N.Y. under the trademark Uvinul N-35 and by Aceto Corp., of Flushing, N.Y. under the trademark Viosorb 910; the material (2-ethylhexyl)-2-cyano-3,3-diphenyl acrylate, sold by BASF under the trademark Uvinul N-539; the material 2-(2'-hydroxy-4'-methylphenyl)benzotriazole, sold by Ciba-Geigy Corp. under the trademark Tinuvin P; the material 3-[3-(2H-benzotriazole-2-yl)-5-(1,1 -dimethylethyl)-4-hydroxyphenyl]propionic acid pentyl ester prepared from Tinuvin 213, sold by Ciba-Geigy Corp., via conventional hydrolysis followed by conventional esterification (hereinafter "Tinuvin PE"); the material 2-hydroxy-4-methoxybenzophenone sold by American Cyanamid under the trademark Cyasorb UV 9; and the material 2-ethyl-2'-ethoxyalnilide sold by Sandoz Color & Chemicals under the trademark Sanduvor VSU—to name a few. Thickeners include polymethylmethacrylate (PMMA) and polycarbonate both of which are commercially available from, among other chemical suppliers, Aldrich Chemical Co. Moreover, the stability of the electrochromic medium can be enhanced in accordance with the teaching of U.S. application Ser. No. 09/377,455 entitled "Color Stabilized Electrochromic Devices" which is incorporated herein by reference.

Electrochromic devices having as a component part an above-identified solubilized material or agent can be used in a wide variety of applications wherein, under normal operation, the transmitted or reflected light can be modulated—the skill of which is well known in the art. Such devices include rear-view mirrors for vehicles; windows for the exterior of a building, home or vehicle; skylights for buildings including tubular light filters; windows in office or room partitions; display devices; contrast enhancement filters for displays; light filters for photographic devices and light sensors; and indicators for power cells as well as primary and secondary electrochemical cells.

The electrochromic media of the present invention utilize many different electroactive and/or electrochromic materials. The preparation and/or commercially available sources are provided herein, unless the material or its associated derivative is well known in the art. It will be understood that, unless specified otherwise, the starting reagents are commercially available from Aldrich Chemical Co., Milwaukee, Wis. and other common chemical suppliers. It will be further understood that conventional chemical abbreviations will be used when appropriate including the following: grams (g); milliliters (ml); moles (mol); millimoles (mmol); molar (M); millimolar (mM); pounds per square inch (psi); and hours (h).

In support of the present invention, several experiments were conducted wherein the solubility characteristics of electroactive materials and beneficial agents associated with a solubilizing moiety were compared to analogous materials and agents without such a solubilizing moiety. The following table provides numerous materials and agents utilized in the experiments below:

| Material/Agent | Preparation/ Commercial Source |
| --- | --- |
| Ferrocene | Aldrich |
| Ferrocenepropylmethylviologen [$BF_4$]$_2$ | Provided herein below |
| Bis-ferrocenehexylviologen [$BF_4$]$_2$ | Provided herein below |
| Ferrocenepropyl-p-cyanohenylviologen [$BF_4$]$_2$ | Provided herein below |
| Tetra-t-butylferrocene | T. Leigh, J. Am. Chem. Soc. 1964, 3294–3302 hereinafter "Leigh") |
| 1-Bromo-6-(tetra-t-butylferocenyl)hexane | U.S. Application Ser. No. 09/377,455 entitled "Color-Stabilized Electrochromic Devices" (hereinafter the '455 Application |
| 1-Triethylammonium-6-(tetra-t-butylferrocenyl)hexane $BF_4$ | '455 Application |
| 1-Triethylammonium-3-(tetra-t-butylferrocenyl)propane $BF_4$ | '455 Application |
| Tetra-t-butylferrocinium $BF_4$ | '455 Application* |
| Tetra-t-butylferrocenehexylmethylviologen [$PF_6$]$_2$ | Provided herein below |
| Tetra-t-butylferrocenepropylmethylviologen [$BF_4$]$_2$ | Provided herein below |
| Octamethylferrocene | Provided herein below |
| Di(triethylammoniumhexyl)octamethylferrocene [$BF_4$]$_2$ | '455 Application** |
| Di(methylpentanoate)octamethylferrocene | Provided herein below |

-continued

| Material/Agent | Preparation/Commercial Source |
|---|---|
| Tinuvin P | Ciba-Geigy |
| Tinuvin PA | Provided herein below |
| 5,10-Dihydro-5,10-dimethylphenazine | Aldrich |
| 5,10-Bis-2-(triethylammonium)ethylphenazine [BF$_4$]$_2$ | Provided herein below |
| N,N'-Bis-(3-ethyl-3H-benzothiazol-2-ylidene)-hyrdazine | S. Hunig et al., Justus Liebigs Ann. Chem.676,36,52 (1964) |
| Trethyl-(4-{2-[(3-methyl-3H-benzothiazol-2-ylidene)-hydrazono]-benzothiazol-3-yl}-butyl)-ammonium BF$_4$ | Provided herein below |
| 2,5,7,10-Tetramethyl-5,10-dihydrophenazine | U.S. Application Ser. No. 09/280,396 entitled "One Pot Synthesis of 5,10-dihydrophenazine compounds and 5,10-substituted dihydrophenazines" (hereinafter the '396 Application) |
| 2,7-Dimethyl-5,10-bis-2-(triethylammonium)-ethylphenazine [BF$_4$]$_2$ | See Infra*** |
| 5-Phenyl-10-(2-piperidin-1-yl-ethyl)-5,10-dihydrophenazine | Provided herein below |
| 1-Methyl-1-[2-(10-phenyl-10H-phenazin-5-yl)-ethyl]-piperidinium hexafluorophosphate | Provided herein below |

*This material was prepared in an analogous manner to di-t-butyl-diethylferrocinium BF$_4$, except that tetra-t-butylferrocene was used instead of di-t-butyl-diethylferrocene.
**This material was prepared in an analogous manner to 1-trietylammonium-6-(tetra-t-butylferrocenyl)-hexane BF$_4$, except that two equivalents of the ammonium species were associated with octamethylferrocene instead of tetra-t-butylferrocenylhexane.
***This material was prepared in an analogous manner to 5,10-bis-2-(triethylammonium)ethylphenazine [BF$_4$]$_2$, except that 2,5,7,10-tetramethyl-5,10-dihydrophenazine was used instead of 5,10-dihydro-5,10-dimethylphenazine.

Synthesis of Ferrocenepropylmethylviologen Tetrafluoroborate 6.32 g (20mmol) of N-methyl-4,4'-dipyridyl hexafluorophosphate was dissolved in 100 ml of acetonitrile whereupon 9.21 g (30 mmol) of 3-bromo-1-ferrocenylpropane was added before heating the mixture to reflux overnight. The 3-bromo-1-ferrocenylpropane was prepared in a similar manner to 6-bromo- 1 -(tetra-t-butyl)ferrocenylhexane as is disclosed in the '455 application using appropriate derivative starting reagents. The solution refluxed for approximately 40 hours after which a yellow solid was collected on a frit in air. The solution was returned to the heat overnight and more yellow material was collected. A total of 4.41 g (35%) was collected and dried by washing with diethyl ether (Et$_2$O) and drying in air. This solid (3.0 g, 4.81 mmol) was dissolved in water and a filtered, aqueous solution of NaBF$_4$ (8.77 g before dissolution) was added to give a red-clay colored precipitate. The material was collected, redissolved in acetone and another filtered, aqueous solution of NaBF$_4$ (5.0 g) was added. The acetone was slowly removed via rotary evaporation until precipitation began, at which point the mixture was heated to dissolution and then slowly cooled for crystallization. The solid was collected in air on a glass frit and washed with Et$_2$O to give 2.29 g (83%) of ferrocenepropylmethylviologen tetrafluoroborate.

Synthesis of Bis-ferrocenehexylviologen Tetrafluoroborate

Bis-ferrocenehexylviologen tetrafluoroborate was prepared in a manner similar to ferrocenepropylmethylviologen tetrafluoroborate using 17.26 g (49.4 mmol) of 6-bromo-1-ferrocenylhexane and 2.5 g (16.0 mmol) of 4,4'-dipyridine to yield 7.71 g (56%) of bis-ferrocenehexylviologen tetrafluoroborate. The 6-bromo-1-ferrocenylhexane was prepared in a similar manner to 6-bromo-1-(tetra-t-butyl)ferrocenylhexane as is disclosed in the '455 application using appropriate derivative starting reagents.

Synthesis of Ferrocenepropyl-p-cyanophenylviologen Tetrafluoroborate

Ferrocenepropyl-p-cyanophenylviologen tetrafluoroborate was prepared analogously to ferrocenepropylmethylviologen tetrafluoroborate using 10.71 g (34.9 mmol) of 3-bromo-1-ferrocenylpropane, 4.01 g (11.6 mmol) of N-p-cyanophenyl-4,4'-dipyridyl tetrafluoroborate (see synthesis below) to give 1.87 g (24%) of ferrocenepropyl-p-cyanophenylviologen tetrafluoroborate as a brown, crystalline solid.

Synthesis of N-p-cyanoDhenyl-4,4'-dipyridyl Tetrafluoroborate 85.9 g (550 mmol) of 4,4'-dipyridyl and 112.2 g (553.9 mmol) of 1-chloro-2,4-dinitrobenzene were dissolved in 500 ml of acetonitrile whereupon the solution was stirred at room temperature for approximately 48 h. The solid was collected on a frit in air, washed with acetonitrile, and dried in vacuo to give 73.2 g (37%) of N-2,4-dinitrophenyl-4,4'-dipyridylchloride. 40.0 g (11.5 mmol) of the dinitro complex and 39.52 g (334.5 mmol) of p-cyanoaniline were dissolved in a mixture of 200 ml of dimethylformamide and 375 ml of water under a nitrogen purge, and the solution was heated at reflux overnight. The solution was cooled, the volume reduced to 200 mL, and 800 ml of acetone was added to precipitate the N-p-cyanophenyl-4,4'-dipyridyl chloride as a tan solid. Further recovery of material from the supernatant liquid was facilitated by solvent volume reduction under reduced pressure. The material was dissolved in a minimal amount of water and acetone was again added to precipitate the material as a white solid. 10 g of NaBF$_4$ was dissolved in approximately 100 ml of water whereupon the solution was filtered. The white solid was dissolved in minimal water, the BF$_4^-$ solution added and the resultant white solid was collected by filtration and dried in vacuo to give 13.44 g (35%) of N-p-cyanophenyl-4,4'-dipyridyl tetrafluoroborate as a white solid.

Synthesis of Tetra-t-butyl-ferrocenehexylmethylviologen Hexafluorophosrphate Tetra-t-butyl-ferrocenehexylmethylviologen hexafluorophosphate was prepared in a manner similar to ferrocenepropylmethylviologen tetrafluoroborate, 5.26 g (9.2 mmol) of 6-bromo-1-tetra-t-butylferrocenylhexane, 1.45 g (4.59 mmol) of N-methyl-4,4'-dipyridyl hexafluorophosphate, and 2.00 g of potassium hexafluorophosphate which served as the anion exchange material to give 0.82 g (19%) of tetra-t-butyl-ferrocenehexylmethylviologen hexafluorophosphate as a greenish solid.

Synthesis of Tetra-t-butyl-ferrocenepropylmethylviologen Tetrafluoroborate 10.19 g (19.17 mmol) of 3-bromo- 1-tetra-t-butylferrocenylpropane, 12.5 g (80 mmol) of 4,4'-dipyridine was dissolved in 100 ml of acetonitrile and heated to reflux for 2 days. The 3-bromo-1-tetra-t-butylferrocenylpropane was prepared in an analogous manner to 6-bromo-1-(tetra-t-butyl)ferrocenylhexane as is disclosed in the '455 application using appropriate derivative starting reagents. After cooling, the solvent was removed by rotary evaporation, $Et_2O$ was added, and the mixture was filtered to give 4.56 g (35%) of a brown solid. 4.0 g (5.82 mmol) of the brown solid was suspended in 50 ml of acetonitrile, whereupon 1.24 ml (20 mmol) of MeI was added before heating to reflux for approximately 5 h. The solution was cooled to room temperature and the precipitate was collected on a glass frit in air. The solid was washed with $Et_2O$ and dried on the frit. The precipitate was dissolved in 1:1 methanol (MeOH) :water ($H_2O$) and a filtered, aqueous solution of $NaBF_4$ (10 g) was added with stirring to give a gold colored precipitate which was again collected on a glass frit in air. The solid was redissolved in acetone, another filtered, aqueous solution of $NaBF_4$ (10 g) was added, and the acetone slowly removed by rotary evaporation until precipitation began. The suspension was then heated to dissolution and the solution slowly cooled for crystallization. The solid was collected, washed with $Et_2O$ and dried in air to give 2.45 g (53%) of tetra-t-butylferrocenepropylmethylviologen tetrafluoroborate as a brownish gold solid.

Synthesis of Octamethylferrocene 25.00 g (204.6 mmol) of 1,2,4,5-tetramethyl-cyclopenta-1,3-diene ($HMe_4Cp$) was charged into a reaction vessel and dissolved in approximately 200 ml of hexane while under positive nitrogen pressure. The solution was cooled with an ice bath to approximately 0° C., whereupon 84 ml (210 mmol) of 2.5M n-butyllithium was charged into the reaction vessel via syringe. Next, the reaction mixture was allowed to warm to room temperature while being agitated overnight. In a separate vessel, 1.95 g (35 mmol) of Fe in approximately 100 ml of tetrahydrofuran (THF) was purged with nitrogen and then cooled to 0° C. 11.56 g (70 mmol) of $FeCl_3$ was charged into the Fe/THF mixture in 3 equal portions, whereupon the mixture was heated to reflux for approximately 2 hours under a nitrogen atmosphere. The $FeCl_2$-2THF was then cooled to room temperature, and transferred to the $LiMe_4Cp$ suspension via cannula. The complete mixture was heated to reflux for 2 hours. After cooling, the reaction was quenched by the addition of approximately 300 ml of water and a small amount of zinc powder. The reaction mixture was charged into a separatory funnel, whereby the organic layer was isolated and collected. The aqueous layer was extracted with $Et_2O$. Next, the organic layers were combined, washed with a saturated brine solution, dried over $MgSO_4$, and filtered. The solvents were then removed by rotary evaporation to give an orange solid which was washed with MeOH and collected on a vacuum frit. Additional product was recovered by reducing the volume of the MeOH solution and cooling in a freezer overnight. The total yield was approximately 22 g of octamethylferrocene.

Synthesis of Di(methylpentanoate) octamethylferrocene 5.00 g (16.8 mmol) of the above-prepared octamethylferrocene was charged into a reaction vessel and dissolved in approximately 100 ml of dichloroethane ($C_2H_4Cl_2$) while under positive nitrogen pressure. 4.48 ml (32.4 mmol) of methyl-5-chloro-5-oxovalerate and 6.7 g (50 mmol) of $AlCl_3$ were charged into the reaction vessel, whereupon the reaction mixture was agitated for approximately 24 hours. Next, approximately 100 ml of water and approximately 2 g of zinc powder were charged into the reaction vessel. The reaction mixture was then agitated for an additional two hours, whereupon approximately 300 ml of $Et_2O$ was added to the mixture. The organic layer was separated via separatory funnel, subsequently washed with a saturated brine solution, and dried over $MgSO_4$. The solution was decanted from the $MgSO_4$ and the solvent was removed via rotary evaporation yielding a red oil. The oily material was washed with and crystallized from hexane. Approximately 5 g of intermediary product was isolated. Next, 3.00 g (5.41 mmol) of the intermediary product was suspended in approximately 100 ml of acetic acid while under nitrogen purge. 0.05 g of $PtO_2.H_2O$ was then charged into the reaction vessel and hydrogen gas was introduced into the vessel at a pressure of approximately 40 psi. After all the reagents were loaded, the reaction vessel was agitated (shaken) for approximately two days, whereupon a further 0.1 g of platinum catalyst was added and the hydrogen pressure reset. Again, agitation was carried for an additional day. Finally, the crude product was isolated using the above-identified conventional organic workup with the exception that final product isolation was obtained using a short path silica gel column. 2.58 g of di(methylpentanoate)octamethylferrocene were obtained.

Synthesis of Tinuvin PA 6.40 kg of Tinuvin 213 from Ciba-Geigy was refluxed in a solution of 10 liters of methanol and 2.5 liters of 10 N sodium hydroxide, for 5 hours, to complete the hydrolysis to the sodium propanoate salt of the benzotriazole. The salt was neutralized with concentrated hydrochloric acid to the propanoic acid and after distillation of the methanol, was extracted into hot toluene. The toluene solution was cooled to room temperature and the precipitated free acid was filtered off, rinsed with ethanol and dried.

33.9 g of the propanoic acid was dissolved into 200 ml of tetrahydrofuran, under a nitrogen atmosphere. To this solution, at room temperature, was slowly added 3.8 g of lithium aluminum hydride which was stirred for 2 hours. After 2 hours, another 3.8 g of lithium aluminum hydride was added and the reaction slurry was refluxed for 16 hours, after which the reaction was quenched with slow addition of ethanol, followed by water. The solution was then neutralized with hydrobromic acid and the tetrahydrofiran distilled off. The reduction product, a propanol derivative, precipitated as an oil and the aqueous supernatant was decanted away.

200 ml of 48% hydrobromic acid was added to the oily residue from above and was refluxed for 48 hours. After cooling to room temperature, 200 ml of water was gradually added and the propyl bromide derivative precipitated out of solution. The aqueous supernatant was discarded. The propyl bromide derivative was recrystallized to 26.6 g of a white solid from 600 ml of acetonitrile.

This white solid was refluxed in a solution containing 100 ml of acetonitrile and 100 ml of triethylamine. After 24 hours the quaternization reaction was complete and after cooling to room temperature the triethylammonium salt precipitated. It was filtered and washed with acetone, leaving a white solid. This solid was then refluxed in a solution of 100 ml of methanol and 300 ml of water containing 100 mmoles of sodium tetrafluoroborate, for 1 hour. Upon cooling, the metathesis product, a white crystalline triethylammonium tetrafluoroborate salt, was filtered and washed with water. It was then dried to give 16.0 g of the desired 3-triethylammonium propyl Tinuvin analogue (Tinuvin PA), the structure of which is provided herein below.

Synthesis of 5,10-Bis-2-(triethylammonium) ethylphenazine Tetrafluoroborate 18.0 g of phenazine, 50.0 g of 2-bromoethanol, 26.1 g of sodium dithionite, 21.2 g of powdered sodium carbonate, 6.2 g of methyltributyl ammonium chloride, 200 ml of acetonitrile and 10 ml of water were charged into a 1 L 3-neck round-bottom flask, which generated a slurry. The slurry was stirred and refluxed for 48 hours under a nitrogen blanket, at which time, the reaction was complete. To the refluxing reaction mixture, 400 ml of water was added over 30 minutes via addition funnel. The reaction was then cooled to room temperature and the product was isolated on a Buchner funnel and washed with 100 ml of water. The 5,10-bis-2-(hydroxyethyl) phenazine was then dried under vacuum at 70° C. overnight. The dry weight of this intermediate was 25.0 g for a 92.6% yield.

The intermediate was charged into a 1 L 3-neck round-bottom flask and was dissolved into 200 ml of pyridine. The solution was cooled to 0° C., after which 15 ml of methanesulfonyl chloride was added drop wise over 30 minutes; while keeping the pot temperature below 20° C. The solution was stirred for 2 hours, then another 10 ml of methanesulfonyl chloride was added drop wise to the 0° C. solution. The reaction solution was allowed to warm to room temperature and was stirred for an additional 2 hours. The reaction was quenched and product was precipitated by the drop wise addition of 400 ml of water. The 5,10-bis-ethyl mesylate phenazine was filtered over a Buchner funnel and washed with copious amounts of water to remove pyridine. It was placed in a vacuum oven to dry at 80° C. overnight. Dry weight of this intermediate was 25.4 g for a 64.4% yield.

The final step is the quaternization of the mesylate intermediate with triethyl amine. The mesylate intermediate was added to a 500 ml round-bottom flask along with 250 ml of acetontrile and 40 ml of triethylamine. This slurry was heated to reflux temperature under an inert atmosphere for 14 days. After cooling to room temperature, 200 ml of a 1:1 mixture of acetone and ethyl acetate was added to the reaction solution. After allowing 3 days for crystallization, the product was filtered off over a Buchner funnel and was washed with 100 ml of acetone.

The dimesylate salt of the bis-triethylammonium phenazine was dissolved in 500 ml of hot water, and to it was added 50 ml of a 40% aqueous sodium tetrafluoroborate solution. The metathesis product precipitated out as an oil, which was then crystallized from a solution of 400 ml of methanol and 200 ml of water. The final product was then isolated as a dark colored crystalline solid.

Synthesis of Triethyl-(4-{2-[(3-methyl-3H-benzothiazol-2-ylidene)-hydrazono]-benzothiazol-3-yl}-butyl)-ammonium Tetrafluoroborate 2-(methylthio)benzothiazole (45.2 g, 0.24 mole), 1,4-dibromobutane (150 ml, 5 eq), potassium iodide (0.5 g), and toluene (80 ml) were heated to reflux for 16 hours. The reaction mixture was subsequently cooled to room temperature and filtered. Dimethyl sulfate (36 ml) was added to the filtrate which was heated to 50° C. for 3 hours to realkylate the resulting thione. Next the mixture was cooled to room temperature, wherein the product was filtered and washed with toluene (100 ml). The solid was slurried again in 150 ml of acetone and filtered to give 51 g (43% yield) of intermediary product, a benzothiazolium salt.

Under nitrogen atmosphere the benzothiazolium salt (10 g, 0.023 mole), 3-methyl-2-benzothiazolium hydrazone hydrochloride (4.5g, 0.02 mole), and acetonitrile (75 ml) was stirred for 10 min. Triethylamine (15 ml) was added drop wise over 30 min. The reaction mixture was stirred for 16 hours. An additional 16 ml of triethylamine was added and refluxed for two days. The reaction mixture was cooled to room temperature and filtered. The filtrate was stripped to oil. Column chromatography was done to remove the residual bromoazine. The bromo salt was then converted to tetrafluoroborate salt by dissolving the bromide salt in hot methanol and then adding 35 ml of 2M sodium tetrafluoroborate salt. The mixture was then cooled to room temperature, filtered, and washed with cold acetonitrile to give 0.5 g of product, namely, triethyl-(4-{2-[(3-methyl-3H-benzothiazol-2-ylidene)-hydrazono]-benzothiazol-3-yl}-butyl)-ammonium tetrafluoroborate.

Synthesis of 5-Phenyl-10-(2-piperidin-1-yl-ethyl)-5,10-dihydrophenazine 9.0 g of phenazine was dissolved into 100 ml of diethyl ether in a 250 ml flask. The solution was purged with argon and kept under argon atmosphere at all times. To the solution was added 40 ml of 1.8 M phenyl lithium in cyclohexane, with an air-tight syringe, over 15 minutes. This mixture was stirred for 1 hour, then 7.4 g of 2-chloroethyl piperidine was added. Then 25 ml of dry THF was added drop wise over 15 minutes and the resulting slurry was stirred at room temperature. After stirring for 24 hours at room temperature, the reaction was heated and refluxed for another 24 hours. The reaction mixture was quenched by the addition of alcohol and was then transferred to a separatory funnel along with ethyl acetate and water. The organic layer was washed with water and then concentrated to an oil. The oil was taken up in hot ethanol and cooled. The crystallized product was filtered, washed with cold ethanol and dried to 6.9 g of the desired product, for a 37.4% yield.

Synthesis of 1-Methyl-1-[2-(10-phenyl-10H-phenazin-5-yl)-ethyl]-piperidinium Hexafluorophosphate 2.1 g of the 5-Phenyl-10-(2-piperidin-1-yl-ethyl)-5,10-dihydrophenazine, prepared as described above, was added to a 100 ml flask along with 2.0 ml of iodomethane and 50 ml of acetonitrile. This solution was refluxed for 24 hours, cooled and the quaternized salt filtered off. The iodide salt was taken up in a hot solution of 500 ml of water and 250 ml of ethanol. To it was added 20 ml of 1 M ammonium hexafluorophosphate solution. After cooling, the precipitated hexafluorophosphate salt of the derivatized phenazine was filtered, washed with water, and then dried for a quantitative yield.

For purposes of clarifying the structures associated with the above-identified anodic materials/agents, and to eliminate any ambiguity associated with the nomenclature of the same, their chemical structures are provided below:

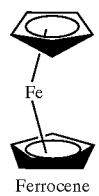

Ferrocene

-continued

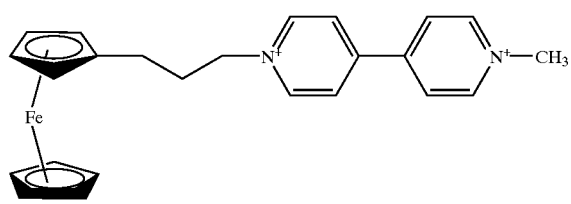

Ferrocenepropylmethylviologen [BF4]2

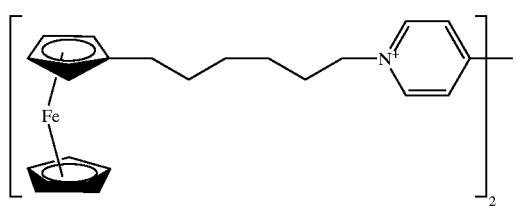

Bis-ferrocenehexylviologen [BF4]2

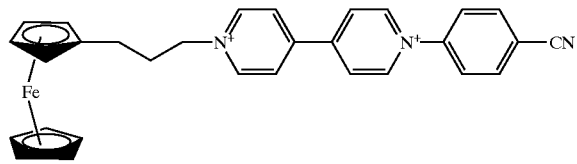

Ferrocenepropyl-p-cyanophenylviologen [BF4]2

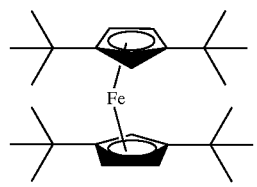

Tetra-t-butylferrocene

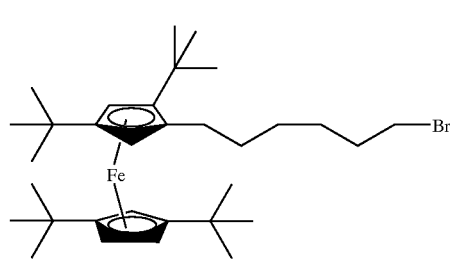

1-Bromo-6-(tetra-t-butylferrocenyl)hexane

-continued

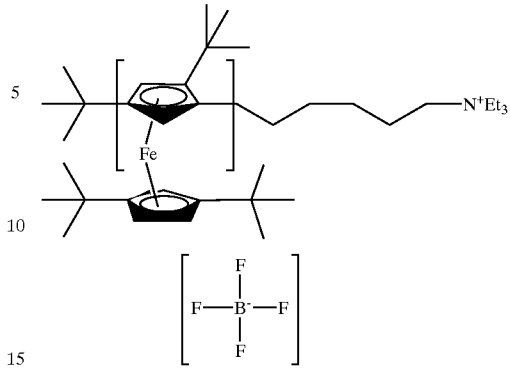

1-Triethylammonium-6-(tetra-t-butylferrocenyl)hexane BF4

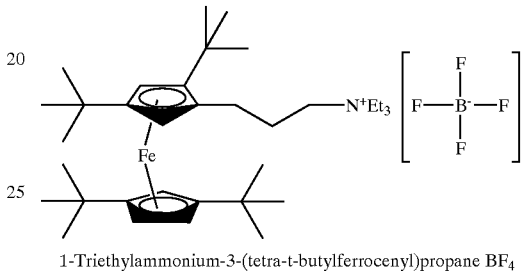

1-Triethylammonium-3-(tetra-t-butylferrocenyl)propane BF4

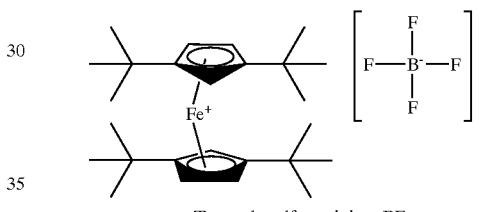

Tetra-t-butylferrocinium BF4

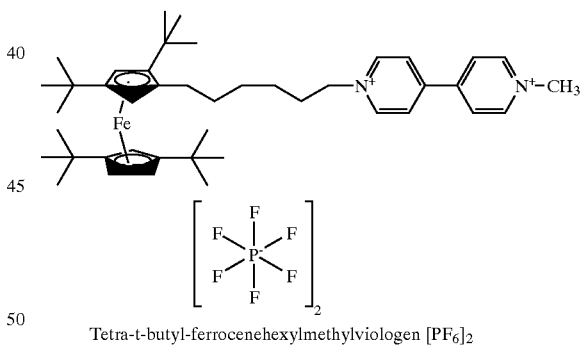

Tetra-t-butyl-ferrocenehexylmethylviologen [PF6]2

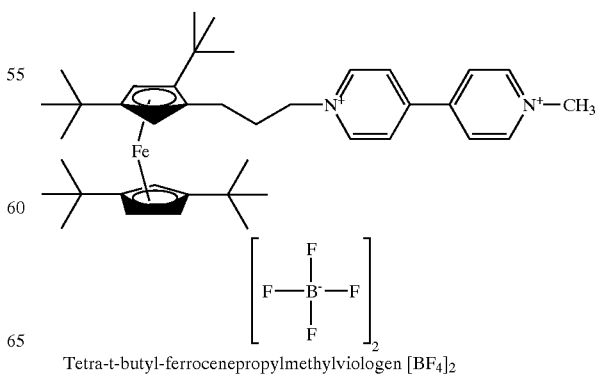

Tetra-t-butyl-ferrocenepropylmethylviologen [BF4]2

-continued

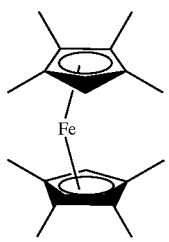
Octamethylferrocene

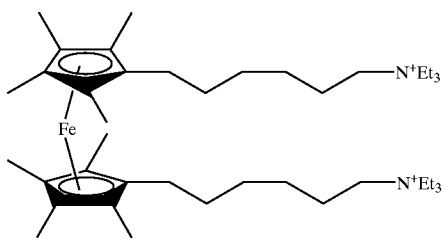
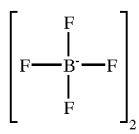
Di(triethylammoniumhexyl)octamethylferrocene [BF$_4$]$_2$

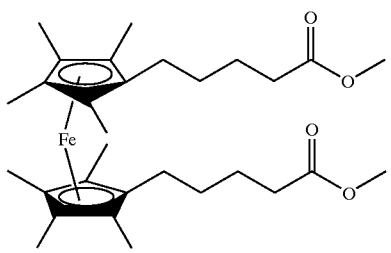
Di(methylpentanoate)octamethylferrocene

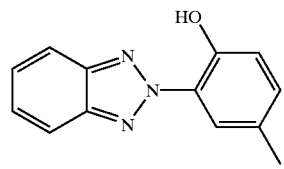
(Tinuvin P) 2-Benzotriazol-2-yl-4-methyl-phenol

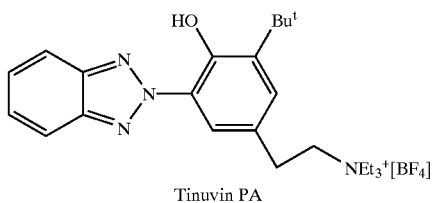
Tinuvin PA

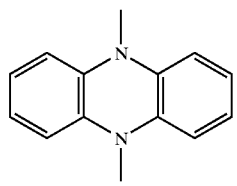
5, 10-Dihydro-5, 10-dimethyphenazine

-continued

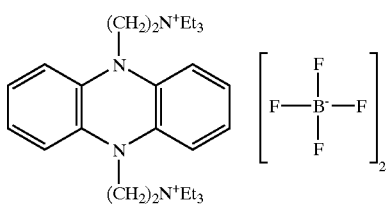
5, 10-Bis-2-(triethylammonium)ethylphenazine [BF$_4$]$_2$

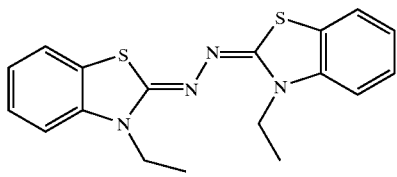
N, N-Bis-(3-ethyl-3H-benzothiazol-2-ylidene)-hydrazine

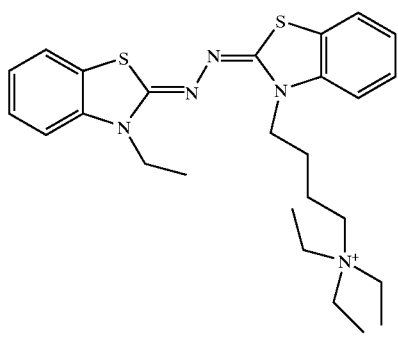
Triethyl-(4-{2-[(3-methyl-3H-benzothiazol-2-ylidene)-hydrazono]-benzothiazol-3-yl}-butyl)-ammonium BF4

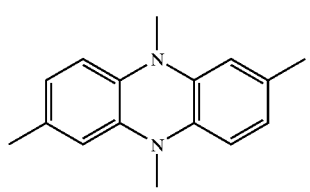
2,5,7,10-Tetramethyl-5,10-dihydrophenazine

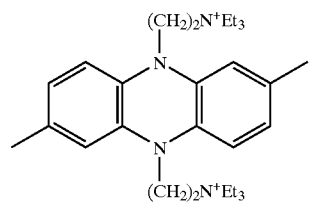
2,7-Dimethyl-5,10-bis-2-(triethylammonium)ethylphenazine [BF$_4$]$_2$

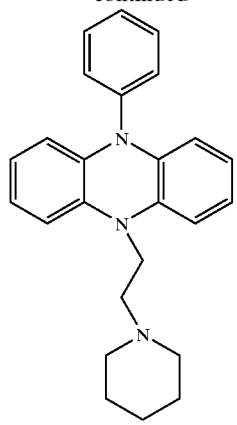

5-Phenyl-10-(2-piperidin-1-yl-ethyl)-5,10-dihydrophenazine

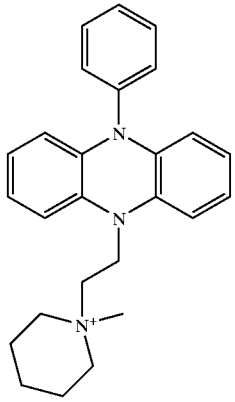

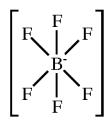

1-Methyl-1-[2-(10-phenyl-10H-phenazin-5-yl)-ethyl]-piperidinium hexafluorophosphate that, the absorption coefficients were assumed to be independent of the solvent used). Next, saturated solutions of the same materials were prepared in the solvent of interest, filtered if necessary, diluted if necessary, and their UV-VIS spectra were again recorded. Using the previously determined absorption coefficients, the concentrations at saturation in the solvent of choice were then calculated using conventional analytical techniques. It should be noted that while substantial care was taken during the experiments to ensure analytical precision and accuracy, minor deviations from absolute values may have been realized due to small changes in ambient temperature and/or atmospheric pressure. Nevertheless, inasmuch as the materials prepared in accordance with the present invention often exhibited a substantial increase in solubility, the effect of such minor temperature and/or pressure deviations upon the solubility characteristics of the materials is immaterial.

| Electroactive Material | $\lambda$ max (nm) | Absorption Coefficient ($\epsilon$) | Solubility in propylene carbonate (mM) |
|---|---|---|---|
| Ferrocene | 440 | 102.9 | 141.5 |
| Ferrocenepropylmethylviologen [BF$_4$]$_2$ | 450 | 148.1 | 319.0 |
| Bis-ferrocenehexylviologen [BF$_4$]$_2$ | 440 | 231.0 | 434.0 |
| Ferroceneproyl-p-cyanophenylviologen [BF$_4$]$_2$ | 419 | 185.0 | 276.0 |

In this experiment, ferrocene comprised the electroactive material void of a solubilizing moiety, and the remainder of the electroactive materials comprised one or more solubilizing moieties. As can be seen from the data collected in this experiment, the electroactive materials comprising a solubilizing moiety exhibited increased solubility by more than approximately a factor of two relative to ferrocene.

| Electroactive Material | $\lambda$max (nm) | Absorption Coefficient ($\epsilon$) | Solubility in propylene carbonate (mM) | Solubility in $\gamma$-butyrolactone (mM) | Solubility in hexane (mM) |
|---|---|---|---|---|---|
| Tetra-t-butylferrocene | 462 | 160.9 | 0.44 | 1.7 | 277.5 |
| 1-Bromo-6-(tetra-t-butyl ferrocenyl)hexane | 456 | 139.0 | 4.32 | — | — |
| 1-Triethylammonium-6-(tetra-t-butylferrocenyl)-hexane BF$_4$ | 454 | 112.7 | 514.4 | 861.3 | — |
| 1-Triethylammonium-6-(tetra-t-butylferrocenyl)-propane BF$_4$ | 450 | 123.1 | 259.8 | — | — |
| Tetra-t-butylferrocinium BF$_4$ | 682 | 475.8 | >399.0 | — | — |
| Tetra-t-butylferrocenehexyl-methylviologen [PF$_4$]$_2$ | 703.5 | 90 | 206 | — | — |
| Tetra-t-butylferrocenepropyl-methylviologen [BF$_4$]$_2$ | 454.5 | 168.0 | 276.0 | — | — |

In each of the experiments below, the electroactive materials/beneficial agents were dissolved at a known concentration in an appropriate solvent, and their UV-VIS spectrum was recorded, whereupon their absorption coefficients were subsequently determined. (It should be noted In this experiment the electroactive material void of a solubilizing moiety comprised tetra-t-butylferrocene, and the remainder of the electroactive materials comprised one or more solubilizing moieties. Again, as can be seen from the data collected in this experiment, the electroactive materials comprising a solubilizing moiety exhibited increased solubility by more than one order of magnitude relative to tetra-t-butylferrocene.

| Electractive Material | λmax (nm) | Absorption Coefficient (ε) | Solubility in propylene carbonate (mM) | Solubility in γ-butyrolactone (mM) | Solubility in hexane (mM) |
|---|---|---|---|---|---|
| Octamethylferrocene | 426 | 123.0 | 20.32 | — | — |
| Di(triethylammoniumhexyl)-octamethylferrocene [BF$_4$]$_2$ | 419 | 128.0 | 619.5 | — | — |
| Di(methylpentanoate)-octamethylferrocene | 420 | 130.8 | 520.5 | — | — |

In this experiment the electroactive material void of a solubilizing moiety comprised octamethylferrocene, and the remainder of the electrochromic materials comprised one or more solubilizing moieties. As can be seen from the data collected in this experiment, the electroactive materials comprising a solubilizing moiety exhibited increased solubility by more than one order of magnitude relative to octamethylferrocene.

| Beneficial Agent | λmax (nm) | Absorption Coefficient (ε) | Solubility in propylene carbonate (mM) | Solubility in γ-butyrolactone (mM) | Solubility in hexane (mM) |
|---|---|---|---|---|---|
| Tinuvin P | 338 | 15150 | 94 | — | — |
| Tinuvin PA | 340 | 15000 | 339 | — | — |

In this experiment the beneficial agent void of a solubilizing moiety comprised Tinuvin P, and Tinuvin PA comprised a solubilizing moiety. As can be seen from the data collected in this experiment, the beneficial agent comprising the solubilizing moiety exhibited increased solubility by more than a factor of three relative to Tinuvin P.

| Electroactive Material | λmax (nm) | Absorption Coefficient (ε) | Solubility in propylene carbonate (mM) | Solubility in γ-butyrolactone (mM) | Solubility in hexane (mM) |
|---|---|---|---|---|---|
| 5,10-Dihydro-5,10-dimethylphenazine | — | — | 110 | — | — |
| 5,10-Bis-(triethylammnonium)ethylphenazine [BF$_4$]$_2$ | — | — | 200 | — | — |

In this experiment the electroactive material void of a solubilizing moiety comprised 5,10-Dihydro-5,10-dimethylphenazine, and 5,10-Bis-2-(triethylammonium) ethylphenazine [BF$_4$]$_2$ comprised a solubilizing moiety. As can be seen from the data collected in this experiment, the electroactive material comprising the solubilizing moiety exhibited increased solubility by approximately a factor of two relative to 5,10-Dihydro-5,10-dimethylphenazine.

| Electroactive Material | λmax (nm) | Absorption Coefficient (ε) | Solubility in propylene carbonate (mM) | Solubility in γ-butyrolactone (mM) | Solubility in hexane (mM) |
|---|---|---|---|---|---|
| N,N'-Bis-(3-ethyl-3H-benzothiazol-2-ylidene)-hydrazine | — | — | 12 | — | — |
| Triethyl-(4-{2-[(3-methyl-3H-benzothiazol-2-ylidene)-hydrazono]-benzothiazol-3-yl}-butyl)-ammonium BF$_4$ | — | — | 47 | — | — |

In this experiment the electroactive material void of a solubilizing moiety comprised N,N'-Bis-(3-ethyl-3H-benzothiazol-2-ylidene)-hydrazine, and Triethyl-(4-{2-[(3-methyl-3H-benzothiazol-2-ylidene)-hydrazono]-benzothiazol-3-yl}-butyl)-ammonium BF$_4$ comprised a solubilizing moiety. As can be seen from the data collected in this experiment, the electroactive material comprising the solubilizing moiety exhibited increased solubility by almost a factor of four relative to N,N'-Bis-(3-ethyl-3H-benzothiazol-2-ylidene)-hydrazine.

| Electroactive Material | λmax (nm) | Absorption Coefficient (ε) | Solubility in propylene carbonate (mM) | Solubility in γ-butyrolactone (mM) | Solubility in hexane (mM) |
|---|---|---|---|---|---|
| 2,5,7,10-Tetramethyl-5,10-dihydro-phenazine | — | — | 55 | — | — |
| 2,7-Dimethyl-5,10-bis-2 (triethylammon- | — | — | 250 | — | — |

| Electro-active Material | λmax (nm) | Absorption Coefficient (ε) | Solubility in propylene carbonate (mM) | Solubility in γ-butyrolactone (mM) | Solubility in hexane (mM) |
|---|---|---|---|---|---|
| ium)ethyl-phenazine [BF$_4$]$_2$ | | | | | |

In this experiment the electroactive material void of a solubilizing moiety comprised 2,5,7,10-Tetramethyl-5,10-dihydrophenazine, and 2,7-Dimethyl-5,10-bis-2-(triethylammonium)ethylphenazine [BF$_4$]$_2$ comprised a solubilizing moiety. As can be seen from the data collected in this experiment, the electroactive material comprising the solubilizing moiety exhibited increased solubility by approximately a factor of four and one half relative to 2,5,7,10-Tetramethyl-5,10-dihydrophenazine.

| Electro-active Material | λmax (nm) | Absorption Coefficient (ε) | Solubility in propylene carbonate (mM) | Solubility in γ-butyrolactone (mM) | Solubility in hexane (mM) |
|---|---|---|---|---|---|
| 5-Phenyl-10-(2-piperidin-1-yl-ethyl)-5,10-dihydrophenazine | — | — | 5 | — | — |
| 1-Methyl-1-[2-(10-phenyl-10H-phenazin-5-yl)-ethyl]-piperidinium hexafluorophosphate | — | — | 500 | — | — |

In this experiment the electroactive material void of a solubilizing moiety comprised 5-Phenyl-10-(2-piperidin-1-yl-ethyl)-5,10-dihydrophenazine, and 1-Methyl-1-[2-(10-phenyl-10H-phenazin-5-yl)-ethyl]-piperidinium hexafluorophosphate comprised a solubilizing moiety. As can be seen from the data collected in this experiment, the electroactive material comprising the solubilizing moiety exhibited increased solubility by approximately a factor of one hundred relative to 5-Phenyl-10-(2-piperidin-1-yl-ethyl)-5,10-dihydrophenazine.

In summary, Experiment Nos. 1–8 verify that, indeed, an electroactive material/beneficial agent that exhibits problematic solubility characteristics can become desirably soluble in particular solvents upon association with solubilizing moieties in accordance with the present invention. Such an increase in solubility can be especially beneficial for electrochromic devices that are routinely exposed to extreme weather conditions inasmuch as cold temperatures can substantially, adversely affect the solubility characteristics of an associated electroactive material/beneficial agent.

While the invention has been described in detail herein in accordance with certain preferred embodiments thereof, many modifications and changes therein may be effected by those skilled in the art. Accordingly, it is our intent to be limited only by the scope of the appending claims and not by way of details and instrumentalities describing the embodiments shown herein.

What is claimed is:

1. An electrochromic medium for use in an electrochromic device, comprising:
    at least one solvent;
    a cathodic electroactive material;
    an anodic electroactive material;
    wherein at least one of the cathodic and anodic electroactive materials is electrochromic; and
    wherein at least one of the cathodic and anodic electroactive materials is associated with a solubilizing moiety which serves to increase solubility of one or both of the associated cathodic and anodic electroactive materials relative to the same without the solubilizing moiety.

2. The electrochromic medium according to claim 1, wherein the solubilizing moiety is selected from the group comprising nitriles, nitro constituents, sulfoxides, sulfonates, sulfonate esters, carboxylates, phosphonium constituents, phosphonates, phosphonites, ammonium constituents, carbonyls including carbonates, carbamates, ketones, esters, and amides, ethers including polyethers, amines including tertiary amines, and mixtures thereof.

3. The electrochromic medium according to claim 1, wherein the solubilizing moiety is represented by at least one of the formulae:

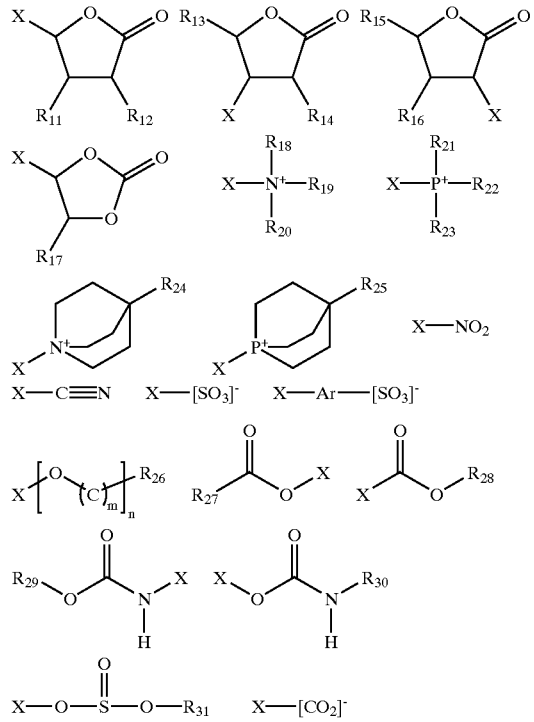

wherein R$_{11}$–R$_{31}$ are the same or different and comprise H or a straight or branched alkyl, aryl, alkaryl, or aralkyl group containing approximately 1 to approximately 10 carbon atoms;

wherein Ar is an aryl constituent including phenyl;

wherein m is an intege[00f8] ranging from approximately 1 to approximately 5;

wherein n is an integer ranging from approximately 1 to approximately 20; and wherein X is associated with at least one of the cathodic and anodic electroactive materials and is selected from the group comprising a direct bond, an alkyl, aryl, alkaryl, aralkyl, ether, or polyether chain containing approximately 1 to approximately 40 carbon atoms, a silyl or siloxyl chain containing approximately 1 to approximately 40 silicon atoms, and mixtures thereof.

4. The electrochromic medium according to claim 1, wherein the solubilizing moiety is represented the formula:

Y—$R_{32}$ wherein Y is associated with at least one of the cathodic and anodic electrochromic materials, serves to increase solubility of the same, and is selected from the group comprising an aryl, alkaryl, aralkyl, or polyether chain containing approximately 1 to approximately 40 carbon atoms, a silyl or siloxyl chain containing approximately 1 to approximately 40 silicon atoms, and mixtures thereof; and wherein $R_{32}$ comprises H or a straight or branched alkyl, aryl, alkaryl, or aralkyl group containing approximately 1 to approximately 10 carbon atoms.

5. The electrochromic medium according to claim 1, wherein the solubilizing moiety is selected from the group comprising an additional anodic electroactive material, an additional cathodic electroactive material, and mixtures thereof.

6. The electrochromic medium according to claim 5, wherein the cathodic and anodic electroactive materials are linked.

7. The electrochromic medium according to claim 1, wherein the cathodic and anodic electroactive materials are linked.

8. The electrochromic medium according to claim 1, wherein the solubilizing moiety comprises a non-electroactive material.

9. The electrochromic medium according to claim 1, wherein the at least one solvent is selected from the group comprising 3-methylsulfolane, sulfolane, glutaronitrile, dimethyl sulfoxide, dimethyl formamide, acetonitrile, polyethers including tetraglyme, alcohols including ethoxyethanol, nitriles including 3-hydroxypropionitrile, 2-methylglutaronitrile, ketones including 2-acetylbutyrolactone, cyclopentanone, cyclic esters including beta-propiolactone, gamma-butyrolactone, gamma-valerolactone, propylene carbonate, ethylene carbonate and homogenous mixtures of the same.

10. The electrochromic medium according to claim 1, wherein the concentration of at least one of the cathodic and anodic electrochromic materials ranges from approximately 1 mM to approximately 1000 mM.

11. The electrochromic medium according to claim 10, wherein the concentration of at least one of the cathodic and anodic electrochromic materials ranges from approximately 5 mM to approximately 500 mM.

12. An electrochromic medium for use in an electrochromic device, comprising:
at least one solvent;
a cathodic electroactive material;
an anodic electroactive material;
wherein at least one of the cathodic and anodic electroactive materials is electrochromic; and
a beneficial agent, wherein the beneficial agent includes a solubilizing moiety which serves to increase solubility of the beneficial agent relative to the same without the solubilizing moiety.

13. The electrochromic medium according to claim 12, wherein the solubilizing moiety is selected from the group comprising nitriles, nitro constituents, sulfoxides, sulfonates, sulfonate esters, carboxylates, phosphonium constituents, phosphonates, phosphonites, ammonium constituents, carbonyls including carbonates, carbamates, ketones, esters, and amides, ethers including polyethers, amines including tertiary amines, and mixtures thereof.

14. The electrochromic medium according to claim 12, wherein the solubilizing moiety is represented by at least one of the formulae:

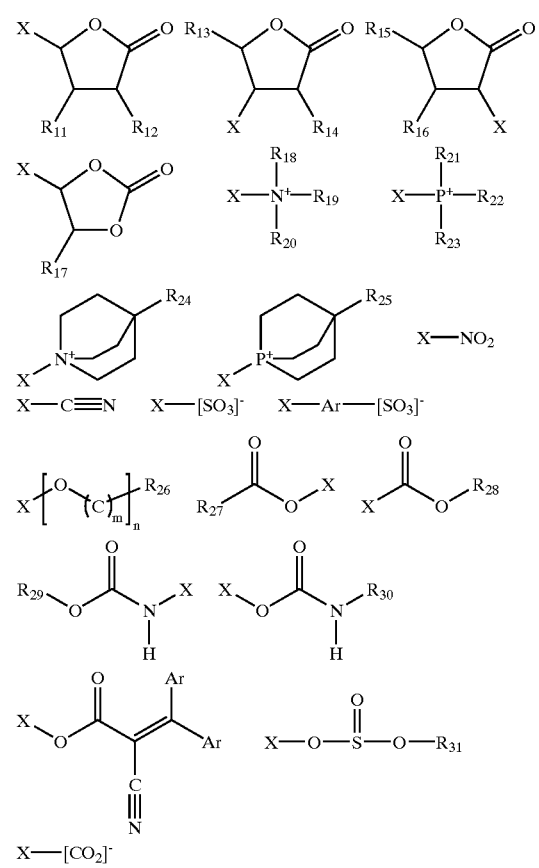

wherein $R_{11}$–$R_{31}$ are the same or different and comprise H or a straight or branched alkyl, aryl, akaryl, or aralkyl group containing approximately 1 to approximately 10 carbon atoms;

wherein Ar is an aryl constituent including phenyl;

wherein m is an integer ranging from approximately 1 to approximately 5;

wherein n is an integer ranging from approximately 1 to approximately 20; and wherein X is associated with the beneficial agent and is selected from the group comprising a direct bond, an alkyl, aryl, alkaryl, aralkyl, ether, or polyether chain containing approximately 1 to approximately 40 carbon atoms, a silyl or siloxyl chain containing approximately 1 to approximately 40 silicon atoms, and mixtures thereof.

15. The electrochromic medium according to claim 12, wherein the solubilizing moiety is represented by the formula:

Y—R$_{32}$ wherein Y is associated with the beneficial agent, serves to increase solubility of the same, and is selected from the group comprising an aryl, alkaryl, aralkyl, or polyether chain containing approximately 1 to approximately 40 carbon atoms, a silyl or siloxyl chain containing approximately 1 to approximately 40 silicon atoms, and mixtures thereof; and wherein R$_{32}$ comprises H or a straight or branched alkyl, aryl, alkaryl, or aralkyl group containing approximately 1 to approximately 10 carbon atoms.

16. The electrochromic medium according to claim 12, wherein the solubilizing moiety is selected from the group comprising an additional anodic electroactive material, an additional beneficial agent, and mixtures thereof.

17. The electrochromic medium according to claim 16, wherein the cathodic and anodic electroactive materials are linked.

18. The electrochromic medium according to claim 12, wherein the cathodic and anodic electroactive materials are linked.

19. The electrochromic medium according to claim 12, wherein the solubilizing moiety comprises a non-electroactive material.

20. The electrochromic medium according to claim 12, wherein the at least one solvent is selected from the group comprising 3-methylsulfolane, sulfolane, glutaronitrile, dimethyl sulfoxide, dimethyl formamide, acetonitrile, polyethers including tetraglyme, alcohols including ethoxyethanol, nitriles including 3-hydroxypropionitrile, 2-methylglutaronitrile, ketones including 2-acetylbutyrolactone, cyclopentanone, cyclic esters including beta-propiolactone, gamma-butyrolactone, gamma-valerolactone, propylene carbonate, ethylene carbonate and homogenous mixtures of the same.

21. The electrochromic medium according to claim 12, wherein the concentration of at least one of the cathodic and anodic electrochromic materials ranges from approximately 1 mM to approximately 1000 mM.

22. The electrochromic medium according to claim 21, wherein the concentration of at least one of the cathodic and anodic electrochromic materials ranges from approximately 5 mM to approximately 500 mM.

23. An electrochromic device, comprising:
at least one substantially transparent substrate having an electrically conductive material associated therewith; and
an electrochromic medium which comprises:
at least one solvent;
a cathodic electroactive material;
an anodic electroactive material;
wherein at least one of the cathodic and anodic electroactive materials is electrochromic; and
wherein at least one of the cathodic and anodic electroactive materials is associated with a solubilizing moiety which serves to increase solubility of one or both of the associated cathodic and anodic electroactive materials relative to the same without the solubilizing moiety.

24. The electrochromic device according to claim 23, wherein the solubilizing moiety is selected from the group comprising nitrites, nitro constituents, sulfoxides, sulfonates, sulfonate esters, carboxylates, phosphonium constituents, phosphonates, phosphonites, ammonium constituents, carbonyls including carbonates, carbamates, ketones, esters, and amides, ethers including polyethers, amines including tertiary amines, and mixtures thereof.

25. The electrochromic device according to claim 23, wherein the solubilizing moiety is represented by at least one of the formulae:

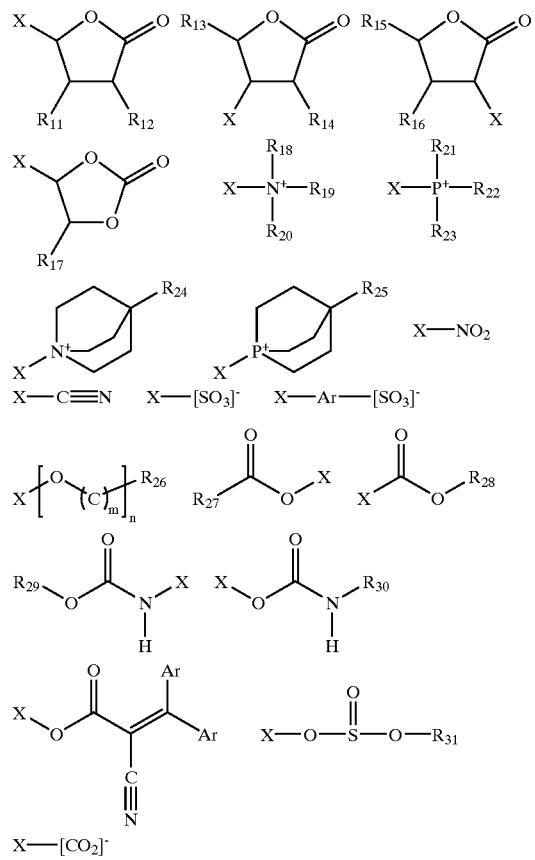

wherein R$_{11}$–R$_{31}$ are the same or different and comprise H or a straight or branched alkyl, aryl, alkaryl, or aralkyl group containing approximately 1 to approximately 10 carbon atoms;

wherein Ar is an aryl constituent including phenyl;

wherein m is an integer ranging from approximately 1 to approximately 5;

wherein n is an integer ranging from approximately 1 to approximately 20; and wherein X is associated with at least one of the cathodic and anodic electroactive materials and is selected from the group comprising a direct bond, an alkyl, aryl, alkaryl, aralkyl, ether, or polyether chain containing approximately 1 to approximately 40 carbon atoms, a silyl or siloxyl chain containing approximately 1 to approximately 40 silicon atoms, and mixtures thereof.

26. The electrochromic device according to claim 23, wherein the solubilizing moiety is represented by the formula:

Y—R$_{32}$ wherein Y is associated with at least one of the cathodic and anodic electrochromic materials, serves to increase solubility of the same, and is selected from the group comprising an aryl, alkaryl, aralkyl, or polyether chain containing approximately 1 to approximately 40 carbon atoms, a silyl or siloxyl chain containing approximately 1 to approximately 40 silicon atoms, and mixtures thereof; and wherein $R_{32}$ comprises H or a straight or branched alkyl, aryl, alkaryl, or aralkyl group containing approximately 1 to approximately 10 carbon atoms.

27. The electrochromic device according to claim 23, wherein the solubilizing moiety is selected from the group comprising an additional anodic electroactive material, an additional cathodic electroactive material, and mixtures thereof.

28. The electrochromic device according to claim 27, wherein the cathodic and anodic electroactive materials are linked.

29. The electrochromic device according to claim 23, wherein the cathodic and anodic electroactive materials are linked.

30. The electrochromic device according to claim 23, wherein the solubilizing moiety comprises a non-electroactive material.

31. The electrochromic device according to claim 23, wherein the at least one solvent is selected from the group comprising 3-methylsulfolane, sulfolane, glutaronitrile, dimethyl sulfoxide, dimethyl formamide, acetonitrile, polyethers including tetraglyme, alcohols including ethoxyethanol, nitriles including 3-hydroxypropionitrile, 2-methylglutaronitrile, ketones including 2-acetylbutyrolactone, cyclopentanone, cyclic esters including beta-propiolactone, gamma-butyrolactone, gamma-valerolactone, propylene carbonate, ethylene carbonate and homogenous mixtures of the same.

32. The electrochromic device according to claim 23, wherein the concentration of at least one of the cathodic and anodic electrochromic materials ranges from approximately 1 mM to approximately 1000 mM.

33. The electrochromic device according to claim 32, wherein the concentration of at least one of the cathodic and anodic electrochromic materials ranges from approximately 5 mM to approximately 500 mM.

34. The electrochromic device according to claim 23, comprising a first substantially transparent substrate and a second substrate.

35. The electrochromic device according to claim 34, wherein the device is an electrochromic window.

36. The electrochromic device according to claim 34, wherein the second substrate is plated with a reflective material.

37. The electrochromic device according to claim 36, wherein the reflective material is selected from the group comprising chromium, ruthenium, rhodium, silver, alloys of the same, and stacked layers thereof.

38. The electrochromic device according to claim 37, wherein the device is an electrochromic mirror.

39. An electrochromic device, comprising:
at least one substantially transparent substrate having an electrically conductive material associated therewith; and
an electrochromic medium which comprises:
at least one solvent;
a cathodic electroactive material;
an anodic electroactive material;
wherein at least one of the cathodic and anodic electroactive materials is electrochromic; and
a beneficial agent, wherein the beneficial agent includes a solubilizing moiety having at least one constituent which serves to increase solubility of the beneficial agent relative to the same without the solubilizing moiety.

40. The electrochromic device according to claim 39, wherein the solubilizing moiety is selected from the group comprising nitrites, nitro constituents, sulfoxides, sulfonates, sulfonate esters, carboxylates, phosphonium constituents, phosphonates, phosphonites, ammonium constituents, carbonyls including carbonates, carbamates, ketones, esters, and amides, ethers including polyethers, amines including tertiary amines, and mixtures thereof.

41. The electrochromic device according to claim 39, wherein the solubilizing moiety is represented by at least one of the formulae:

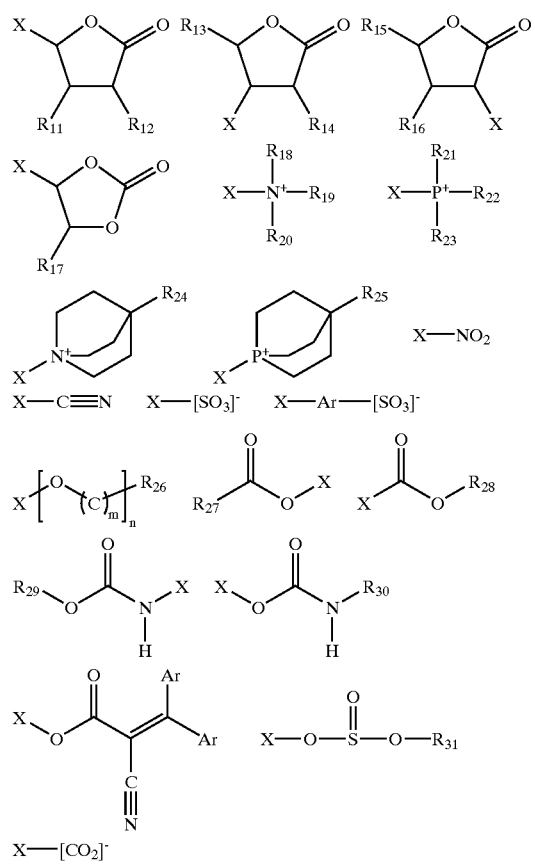

wherein $R_{11}$–$R_{31}$ are the same or different and comprise H or a straight or branched alkyl, aryl, alkaryl, or aralkyl group containing approximately 1 to approximately 10 carbon atoms;

wherein Ar is an aryl constituent including phenyl;

wherein m is an integer ranging from approximately 1 to approximately 5;

wherein n is an integer ranging from approximately 1 to approximately 20; and wherein X is associated with the beneficial agent and is selected from the group comprising a direct bond, an alkyl, aryl, alkaryl, aralkyl, ether, or polyether chain containing approximately 1 to approximately 40 carbon atoms, a silyl or siloxyl chain containing approximately 1 to approximately 40 silicon atoms, and mixtures thereof.

42. The electrochromic device according to claim 39, wherein the solubilizing moiety is represented by the formula:

$$Y-R_{32}$$

wherein Y is associated with the beneficial agent, serves to increase solubility of the same, and is selected from the group comprising an aryl, alkaryl, aralkyl, or polyether chain containing approximately 1 to approximately 40 carbon atoms, a silyl or siloxyl chain containing approximately 1 to approximately 40 silicon atoms, and mixtures thereof; and wherein $R_{32}$ comprises H or a straight or branched alkyl, aryl, alkaryl, or aralkyl group containing approximately 1 to approximately 10 carbon atoms.

43. The electrochromic device according to claim 39, wherein the solubilizing moiety is selected from the group comprising an additional anodic electroactive material, an additional beneficial agent, and mixtures thereof.

44. The electrochromic device according to claim 43, wherein the cathodic and anodic electroactive materials are linked.

45. The electrochromic device according to claim 39, wherein the cathodic and anodic electroactive materials are linked.

46. The electrochromic device according to claim 39, wherein the solubilizing moiety comprises a non-electroactive material.

47. The electrochromic device according to claim 39, wherein the at least one solvent is selected from the group comprising 3-methylsulfolane, glutaronitrile, dimethyl sulfoxide, dimethyl formamide, acetonitrile, polyethers including tetraglyme, alcohols including ethoxyethanol, nitriles including 3-hydroxypropionitrile, 2-methylglutaronitrile, ketones including 2-acetylbutyrolactone, cyclopentanone, cyclic esters including beta-propiolactone, gamma-butyrolactone, gamma-valerolactone, propylene carbonate, ethylene carbonate and homogenous mixtures of the same.

48. The electrochromic device according to claim 39, wherein the concentration of at least one of the cathodic and anodic electrochromic materials ranges from approximately 1 mM to approximately 1000 mM.

49. The electrochromic device according to claim 48, wherein the concentration of at least one of the cathodic and anodic electrochromic materials ranges from approximately 5 mM to approximately 500 mM.

50. The electrochromic device according to claim 39, comprising a first substantially transparent substrate and a second substrate.

51. The electrochromic device according to claim 50, wherein the device is an electrochromic window.

52. The electrochromic device according to claim 50, wherein the second substrate is plated with a reflective material.

53. The electrochromic device according to claim 52, wherein the reflective material is selected from the group comprising chromium, rhodium, silver, alloys of the same, and stacked layers thereof.

54. The electrochromic device according to claim 53, wherein the device is an electrochromic mirror.

* * * * *